United States Patent [19]

Pieper

[11] 4,107,446

[45] Aug. 15, 1978

[54] METHOD AND APPARATUS FOR MEASURING THE TEMPERATURE OF MOLTEN MASSES

[75] Inventor: Helmut Pieper, Lohr, Fed. Rep. of Germany

[73] Assignee: Sorg GmbH & Co. KG, Pflochsbach, Fed. Rep. of Germany

[21] Appl. No.: 754,871

[22] Filed: Dec. 27, 1976

[51] Int. Cl.² ............................................. C03B 5/02
[52] U.S. Cl. ........................................................ 13/6
[58] Field of Search ......................................... 13/6, 24

[56] References Cited

U.S. PATENT DOCUMENTS

| | | | |
|---|---|---|---|
| 3,585,267 | 6/1971 | Obersby | 13/6 |
| 3,636,227 | 1/1972 | McQuaid | 13/6 |
| 3,984,611 | 10/1976 | Varrasso | 13/6 |

Primary Examiner—R. N. Envall, Jr.
Attorney, Agent, or Firm—Burgess, Dinklage & Sprung

[57] ABSTRACT

The temperature or temperature profile of an electrically conductive molten mass heated by electrodes immersed therein is measured during continuous operation by momentarily cutting off the electrical energy supplied to the heating electrodes, passing measuring currents through the molten mass via the heating electrodes during the momentary cut off, measuring the electrical resistance between pairs of heating electrodes in measuring paths defined by such electrodes and then calculating the temperature existing within the individual measuring paths on the basis of the measure resistance values.

9 Claims, 2 Drawing Figures

METHOD AND APPARATUS FOR MEASURING THE TEMPERATURE OF MOLTEN MASSES

BACKGROUND

This invention relates to a method and apparatus for measuring and recording the temperature of an electrically conductive molten mass which is heated by electrodes immersed in the mass, particularly molten glass masses in glass melting furnaces and feeders, feeder heads and passages associated with such furnaces.

There is known a method for determining the temperature of molten glass masses by measuring the electrical conductivity of the molten glass mass; constant low voltage currents flow through the glass mass and the power required to maintain such voltage is used to calculate the temperature of the glass. However, there are drawbacks to this method. For one, auxiliary measuring electrodes must be brought into, and kept in contact with the molten glass mass. Furthermore, because of heating currents created by the heating electrodes, a constant low voltage current cannot be maintained, and the power cannot be measured easily or not at all.

Also, it is known to measure temperature by using thermocouples immersed in the molten glass mass. This has disadvantages in that replacement of broken thermocouples is difficult or impossible, and especially that measurement can only be made at a point directly adjacent a wall.

The present invention avoids these disadvantages and, in particular, makes it not only possible to measure or detect the temperature at separate points or measuring paths within a molten glass mass, but also to produce a precise pattern of the temperature profile or distribution, i.e. of the isotherms, within the molten glass mass.

The invention can be carried out without the use of auxiliary electrodes or thermocouples, is fast in operation and, particularly, provides information with respect to the temperature of individual measuring paths and the temperature distribution within the entire furnace.

The present invention also makes it possible to control the operation of a glass melting furnace by employing the temperatures measured in accordance with the invention.

SUMMARY

The method of the invention for measuring the temperature or temperature profile of an electrically conductive molten mass heated by electrodes immersed therein, especially molten glass masses in glass melting furnaces in glass carrying feeders, feeder heads in passages, comprises, during continuous operation, momentarily cutting off the electrical energy supplied to the heating electrodes, passing measuring currents through the motlen mass via the heating electrodes during the momentary cut off, measuring the electrical resistance between pairs of heating electrodes in measuring paths defined by such electrodes, and calculating the temperature existing within the individual measuring paths on the basis of the thus measured resistance values.

Apparatus for measuring the temperature or temperature distribution according to the invention includes means to momentarily cut off the heating currents applied to the electrodes, means for passing measuring currents through the molten mass via said electrodes, means to measure the electrical resistance between pairs of said electrodes and means to calculate the temperature on the basis of the measured resistance values. The means for passing measuring currents preferably includes a conductive connection between at least one measuring instrument and each electrode taking part in the measurement. Control means for regulating the connectors and memory means for storing and retrieving the measured data are also preferably included. A computer that can be utilized for calculating the isotherms in the molten mass from the measured resistance values.

DESCRIPTION OF THE DRAWING

The present invention will be more fully understood from the following description taken in conjunction with the accompanying drawings wherein.

DESCRIPTION

Figure 1:
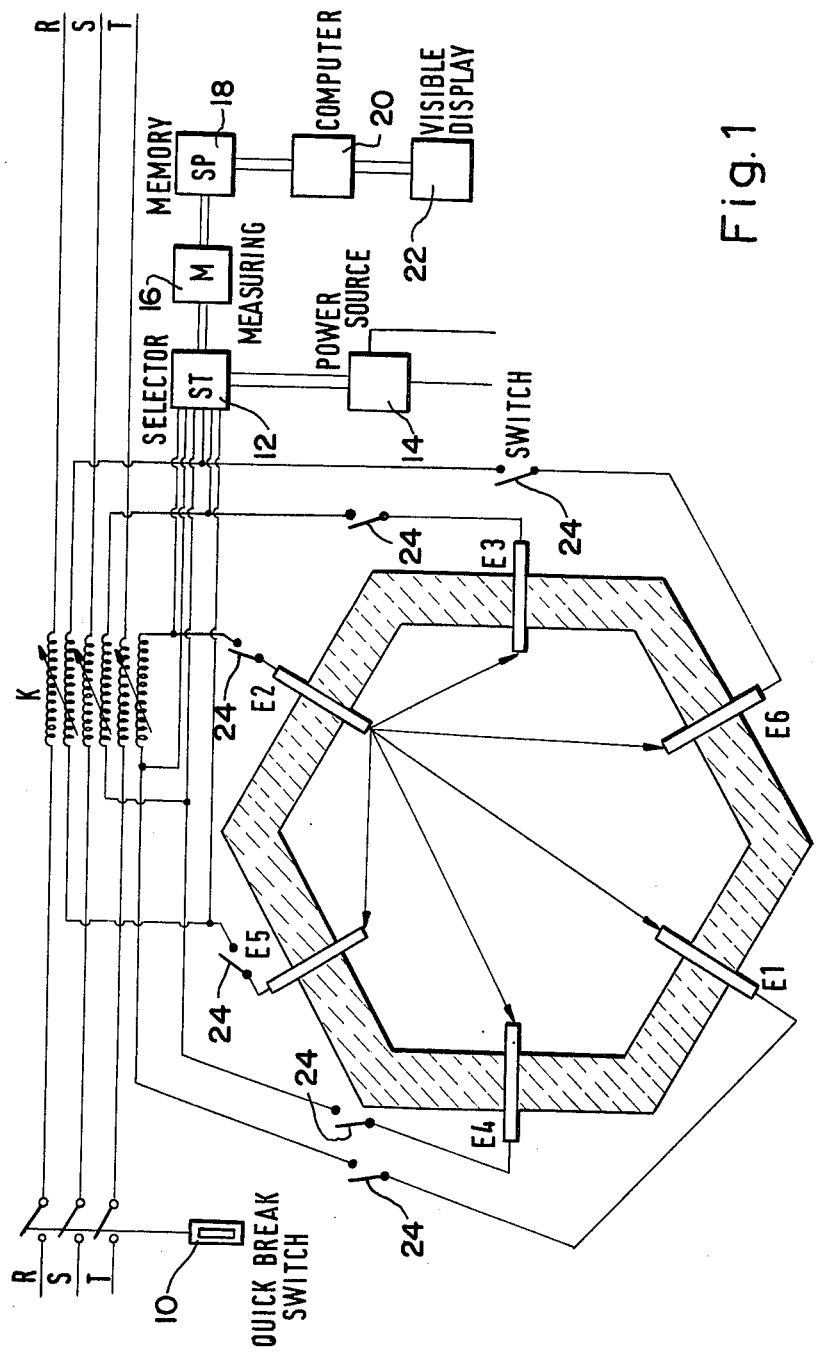
FIG. 1 is a horizontal sectional view and schematic diagram of a furnace according to the invention.

Advantageously, the measurements are performed in periodic intervals so as to monitor time-dependent variations. In addition to being able to calculate the vertical and horizontal isotherms in the molten mass, it is also possible to determine the magnitudes of the consumption of the individual electrodes by comparing the resistance values within the various measuring paths, or on the basis of knowledge about the shift of the temperature maximum.

In the following, an exemplary embodiment of the present invention is explained in greater detail by referring to the accompanying drawing. The Figures of the drawing each show a schematical sectional view along a plane of an electrically heated glass melting furnace including six electrodes fed by three-phase A.C. current. Normally, a plurality of planes or levels of this kind are arranged one above the other, whereby the electrodes may be arranged either in star connection, in delta connection or in single-phase relation. Furnaces of this type are described in greater detail, for example, in U.S. Pat. No. 3,742,111, issued June 26, 1973.

Figure 2:
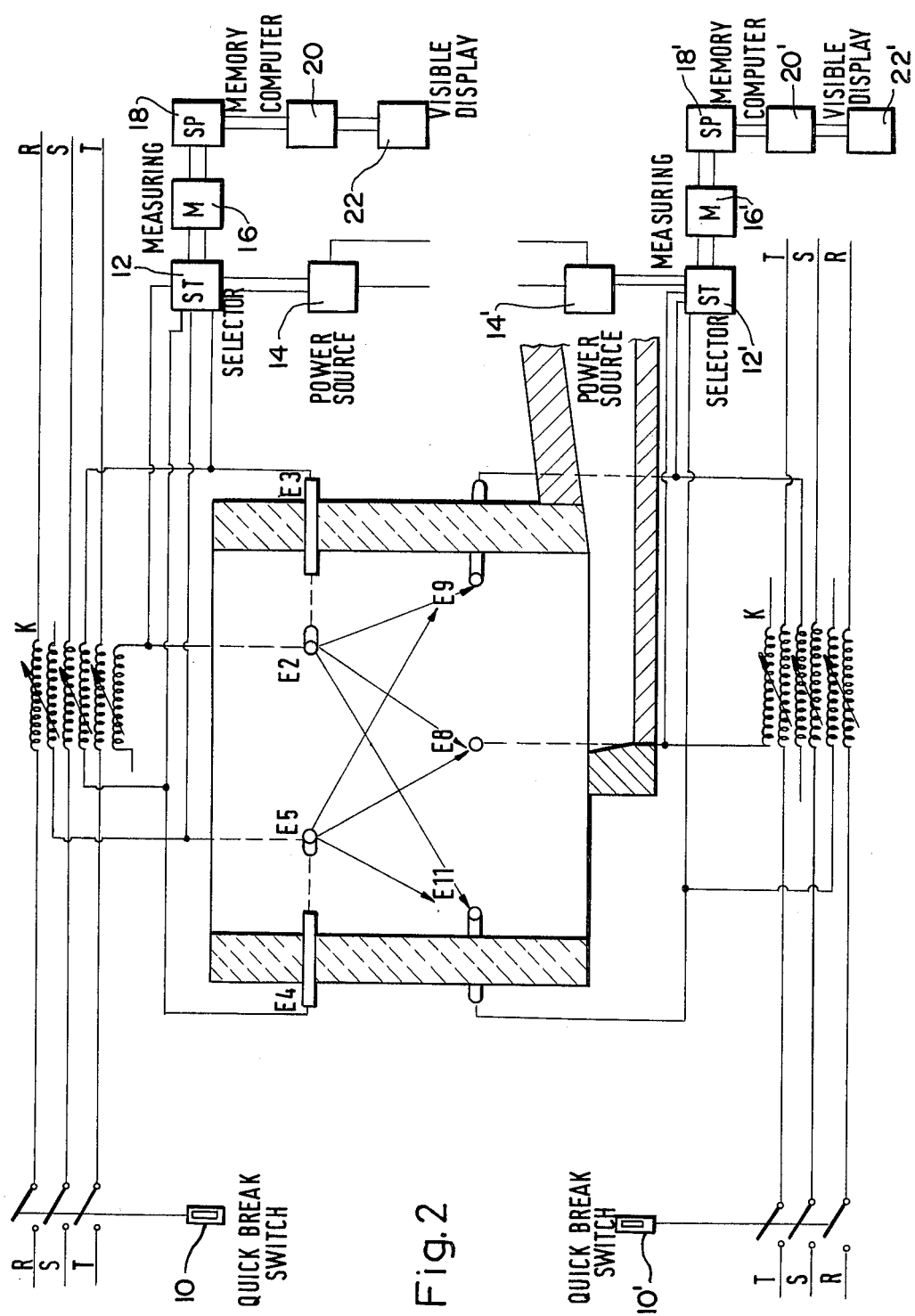
FIG. 2 is a vertical sectional view and schematic diagram of a furnace according to the invention.

According to the horizontal section of FIG. 1 and in vertical section of FIG. 2, the current for heating the glass mass is fed through three phases R, S, T and supplied to the individual electrodes via control transformers K. In this arrangement, the connections between the transformers and the electrodes have a large cross-section because the amperage of the current supplied is high.

Quick break switches are connected into the three conductors leading to the primary sides of transformers K, which switches may preferably be of mechanical construction in view of the high amperages, whereby e.g. oil-filled power switches are preferred. By means of these quick break switches, shown as ganged mechanical switch 10 in the FIG. 1, power cut-off can be effected in a minimum of time, e.g. within a period of less then one-tenth of a second. The same applies to the reconnection after an interruption of power.

A control device 12 is conductively connected to all electrodes E or to the conductors between the secondary windings of the transformers K feeding the furnace and the electrodes E. The device 12 is adapted to sequentially control all electrodes via a conductive conduit; this means that the device 12 acts as a sequential switch connecting pairs of electrodes and is adapted to select the controlled pairs of electrodes in any desired manner. The control device 12 is supplied with current from a power source 14, whereby both D.C. power and A.C. power may be used.

The control device 12 has connected thereto a measuring instrument or device 16 which measures amperage and voltage in the respective closed-circuit, and which is adapted to determine the resistance between the electrode tips.

The results obtained from the measuring instrument 16 are transferred to a memory 18, whereby the control device 12 may control at least one further electrode E so as to initiate another measuring operation.

Memory 18 stores a desired number of measurement data and thereafter transfers such data to a computer 20 for controlling or regulating the heating current on the one hand, and to an output display 22 on the other hand, which can be a plotter or a visible display instrument adapted to display the relevant information to the operating personnel.

The measuring operation may take place in such a way that the resistance is detected first between electrodes E2 and E3, then between electrodes E2 and E6, thereafter between electrodes E2 and E1, and so on with the resistance values being entered in the memory 18. Then, a second measurement sequence can be performed wherein the resistance values between electrodes E3 and E6, E3 and E1, E3 and E4, E3 and E5 and E3 and E2 are detected. This measurement sequence is then repeated by using another electrode as the main or principal electrode, until all measuring paths between all of the electrodes of one plane (level) have been measured.

In the further course of the measuring operation, another plane of the glass melting furnace is measured through in corresponding manner, whereupon the resistance between the electrodes of the various planes or levels is determined three-dimensionally (FIG. 2).

FIG. 2 shows a vertical sectional view and schematic diagram of the furnace of the present invention. In this view, it can be clearly seen that two levels of electrodes can be equally adapted to the measuring operation according to the present invention. Consistent with FIG. 1, the upper level of electrodes utilizes the equivalent circuitry to carry out the measuring operation and thus the schematic for the upper level utilizes elements 10-22. The lower level electrodes also use similar circuit elements and these have been labeled 10'-22' in order to signify that they perform a similar function as those elements numbered 10-22, respectively.

In view of the fact that the electronic control device 12 as well as the measuring instrument 16 and the storage means 18 are capable of performing such measuring operations within a minimum of time, the full measuring process can be completed within seconds or minutes at most, and the heating voltage is thereafter applied again by closing of the quick break switch 10 such that the furnace may continue to operate without causing any noticeable disturbance by the momentary interruption.

The measured resistance values of the various measuring paths between electrode pairs as stored in the memory are entered into the computer along with a correspondingly adapted program, whereby the computer furnishes, on the one hand, data regarding the individual measuring paths and, on the other hand, a diagram of the isotherms within the furnace.

With a corresponding program design, however, the stored data may be used also for the direct control of the furnace.

The above-described mode of operation makes it possible to determine substantially the entire temperature distribution or profile within the furnace which means that control of the furnace may be accomplished in a much better way than with conventional measuring methods. Thus, the performance of the furnace in relation to volume can be substantially increased, and the quality of the glass can be improved.

Furthermore, shifting of the isotherms or increase of the resistance of predetermined measuring paths, respectively, makes it to determine which electrodes have been consumed to a particular high degree, and these electrodes may be further advanced if required, if molybdenum electrodes are involved, for instance.

Also, the above-described measurement in separate measuring paths across the furnace makes it possible to detect cold spots or hot spots within the molten glass mass, such that the power may be increased or reduced, respectively, for the measuring path in question or for the two respective electrodes. However, in order to not upset the optimum high overall performance as already obtained and thereby to obtain an optimum rate of mass flow, the power outputs of the other electrodes may then be set correspondingly in the opposite sense.

Of course, the length of the measuring path has to be taken into consideration in the program for the electronic data processing for determining the glass temperature. Additionally, the measurement is affected by the fact that currents flow through electrodes not utilized for the direct measurement and through the secondary side of the transformers. These currents show a fixed resistance in the overall system such that they can be taken into consideration in making up the program.

Another way of avoiding current flow through the other electrodes resides in cutting off at the secondary side of the transformer all electrodes which do not participate in the measurement. To this end, switches 24 are provided between the electrodes and the secondary windings, which switches, after the operation of the switch 10 provided on the primary side of the transformers, may be opened, too. These switches 24 are thereafter closed before energy is supplied again. However, in view of the fact that the currents involved are high and the secondary side switches 24 require high expenditure to be made, a consideration of the current flow through the electrodes which are not used directly for the measurement, is preferred. In particular, a determination of the current flow through each of the electrodes which do not take part in the measuring process as such, can be made in a manner to those skilled in the art, and current conductors existing outside of the measuring path proper may then be summed up for each measuring path.

What is claimed is:

1. Method for measuring the temperature or temperature distribution of an electrically conductive molten mass which is heated by electrodes receptive of heating current during use and immersed in the molten mass, especially molten glass masses in glass melting furnaces and glass-carrying feeders, feeder heads and passages which comprises, during continuous operation, momentarily cutting off the heating current supplied to the heating electrodes, passing measuring currents through the molten mass via the heating electrodes during the momentary cut-off, measuring the electrical resistance between pairs of heating electrodes in measuring paths defined by such electrodes, and calculating the temperatures existing within the individual measuring paths on the basis of the thus measured resistance values.

2. Method of claim 1 wherein the vertical and horizontal isotherms in the molten mass are calculated from the temperatures existing in the individual measuring paths.

3. Method of claim 1 wherein the measurements are taken in periodic intervals of time.

4. Method of claim 1 wherein at least six electrodes are positioned within at least one plane in the molten mass, the deviations from a set value during a measuring step are utilized for determining a corresponding correction of the heating current between a pair of oppositely disposed electrodes, 5. Apparatus for measuring the temperature or temperature distribution of an electrically conductive molten mass which is heated by electrodes receptive of heating current during use and immersed in the molten mass which comprises means to momentarily cut off the heating current supplied to the electrodes, means for passing measuring currents through the molten mass via said electrodes, means to measure the electrical resistance between paris of said electrodes and means to calculate the temperature of the basis of the measured resistance values.

6. Apparatus of claim 5 wherein the cut off means is a quick break switch.

7. Apparatus of claim 5 wherein the means for passing measuring currents includes at least one measuring instrument, control means for regulating conductive connections between each electrode and at least one measuring instrument and memory means for storing and retrieving measured data.

8. Apparatus of claim 5 including computer means for calculating the isotherms in the molten mass.

9. Apparatus of claim 5 wherein at least six electrodes are positioned in at least one plane in the molten mass and means are provided for determining the correction for the heating current based on deviations from a set value between pairs of oppositely disposed electrodes during the measuring.

* * * * *